US009058442B2

(12) United States Patent
Hollis

(10) Patent No.: US 9,058,442 B2
(45) Date of Patent: *Jun. 16, 2015

(54) INCORPORATING NOISE AND/OR JITTER INTO WAVEFORM GENERATION

(75) Inventor: Timothy M. Hollis, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 386 days.

This patent is subject to a terminal disclaimer.

(21) Appl. No.: 13/567,867

(22) Filed: Aug. 6, 2012

(65) Prior Publication Data

US 2013/0031151 A1    Jan. 31, 2013

Related U.S. Application Data

(63) Continuation of application No. 11/868,145, filed on Oct. 5, 2007, now Pat. No. 8,239,432.

(51) Int. Cl.
*G06F 7/02* (2006.01)
*G06F 17/50* (2006.01)
*G06F 17/17* (2006.01)

(52) U.S. Cl.
CPC .......... *G06F 17/5009* (2013.01); *G06F 17/17* (2013.01); *G06F 2217/10* (2013.01); *G06F 2217/16* (2013.01); *G06F 2217/82* (2013.01)

(58) Field of Classification Search
CPC ........ G06F 17/17; G06F 1/0356; G06F 7/552; G06F 7/66; G05B 19/4103
USPC .................................................. 708/270–277
See application file for complete search history.

(56) References Cited

U.S. PATENT DOCUMENTS

| | | | |
|---|---|---|---|
| 6,178,213 B1 * | 1/2001 | McCormack et al. ......... 375/355 |
| 7,672,804 B2 * | 3/2010 | Rivoir ........................... 702/124 |
| 8,239,432 B2 | 8/2012 | Hollis | |
| 2007/0162240 A1 * | 7/2007 | Foster et al. .................... 702/69 |
| 2009/0094302 A1 | 4/2009 | Hollis | |

* cited by examiner

*Primary Examiner* — Tan Mai
(74) *Attorney, Agent, or Firm* — Schwegman Lundberg & Woessner, P.A.

(57) ABSTRACT

Methods and apparatus disclosed herein operate, for example, to derive a non-ideal received signal from an ideal signal, to compute, from the non-ideal received signal, at least one probability density function of amplitude and time values representing deviations from the ideal signal, to derive at least one amplitude noise component and at least one timing jitter component from the at least one probability density function, and to generate a non-ideal waveform by applying the at least one amplitude noise component and the at least one timing jitter component to an ideal waveform.

20 Claims, 15 Drawing Sheets

US 9,058,442 B2

INCORPORATING NOISE AND/OR JITTER INTO WAVEFORM GENERATION

PRIORITY APPLICATION

This application is a continuation of U.S. application Ser. No. 11/868,145, filed Oct. 5, 2007 now U.S. Pat. No. 8,239,432, which is incorporated herein by reference in its entirety.

FIELD OF THE INVENTION

One or more embodiments of this invention relate to improved methods for simulating signals in a computerized simulation program, and in particular to techniques for incorporating noise and/or jitter into a simulated time-domain waveform. This application is related to U.S. patent application Ser. No. 11/549,646, filed Oct. 14, 2006, which is incorporated herein by reference.

BACKGROUND

Circuit designers of multi-Gigabit systems face a number of challenges as advances in technology mandate increased performance in high-speed components. At a basic level, data transmission between high-speed components within a single semiconductor device or between two devices on a printed circuit board may be represented by the system 10 shown in FIG. 1. In FIG. 1, a transmitter 12 (e.g., a microprocessor) sends data over a transmission channel 14 (e.g., a copper trace on a printed circuit board or "on-chip" in a semiconductor device) to a receiver 16 (e.g., another processor or memory). When data is sent from an ideal transmitter 12 to a receiver 16 across an ideal (lossless) channel, all of the energy in a transmitted pulse will be contained within a single time cell, which is an example of a unit interval (UI).

However, real transmitters and real transmission channels do not exhibit ideal characteristics, and the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will end to spread or disperse as it passes over the transmission path. This is shown in FIG. 2. As shown, a single pulse of data 15a is sent by the transmitter 12 during a given UI (e.g., UI 3). However, because of the effect of the channel 14, this data pulse 15b becomes spread over multiple UIs at the receiver 16, i.e., some portion of the energy of the pulse is observed outside of the UI in which the pulse was sent (e.g., in UI 2 and UI 4). This residual energy outside of the UI of interest may perturb a pulse otherwise occupying either of the neighboring UIs in a phenomenon referred to as intersymbol interference (ISI).

Due to several factors associated with the complexity in designing, building, and testing such circuitry, it is a common practice in the art of integrated circuit design to simulate the operation of a circuit using a computer system. Simulation software allows the circuit designer to verify the operation and margins of a circuit design before incurring the expense of actually building and testing the circuit. Simulation is particularly important in the semiconductor industry, where it is generally very expensive to design and produce a given integrated circuit. Through the use of simulations, design errors or risks are hopefully identified early in the design process, and resolved prior to fabrication.

The challenge associated with simulating channel-affected signals is highly correlated to the characteristics of the degradation imposed by the transmission channel. As will be discussed in greater detail, signals in any transmission medium experience both random and deterministic degradation. Random degradation, in the form of random Gaussian distributed voltage noise and timing noise (which is often referred to as "jitter") stemming from thermal and shot noise, requires statistical quantification. Similarly, deterministic voltage noise and timing jitter are linked to several sources, including power supply noise, inter-channel crosstalk, impedance discontinuities, component variance, and at high frequencies the response of the channel, resulting in a variety of observable characteristics, from periodicity to uncorrelated-bounded randomness. To model these noise components correctly requires the ability to designate their probabilities during the noise generation stage and consequently apply or superimpose these effects onto the underlying signal in a way that reflects what occurs in the actual system. The final success or robustness of a particular design is dependent, to a large measure, on the achieved realism of the simulation environment. To date, industry standard simulators do not provide the level of noise and jitter generation control needed to accurately model a realistic communication link.

Another challenge simulating realistic signaling environments is tied to the underlying statistical assumption that sufficient samples of the behavior to be characterized are readily available. As such, it is becoming necessary to include more and more cycles with each simulation. At the same time, the relative size of each individual noise component, be it amplitude noise or timing jitter, is very small with respect to the overall signal amplitude and/or cycle period, implying that fine voltage and timing resolution are also necessary. When fine simulated resolution is coupled with a large number of simulated cycles, the result is an enormous amount of data and prohibitively lengthy simulation times. It is not uncommon for transistor-level transient (time-based) simulations to run for hours or even days. It is likewise not uncommon for such a simulation to fail due to a lack of memory resources.

Because simulation time and memory requirements associated with transistor level evaluation are prohibitive, a large portion of high-speed link design and verification is carried out at the system level with programs like Matlab. These tools allow the designer to take a more statistical look at the link behavior. Statistical models are often used to predict data eye closure at low bit error rates (BERs) because it is simply not practical to simulate to a standard BER, such as $1 \times 10^{-12}$. Statistical simulation requires the circuit designer to make a number of assumptions, such as the noise characteristics of the power supply or reference voltage (Vref). Further, most statistical methods are based on the system pulse response, which is typically obtained through either the system impulse response or the system step response. One shortcoming of such an approach is that the measured system responses correspond to a specific circuit bias configuration, while the circuit biasing varies over time. Finally, and perhaps most restrictively, statistical analysis rests on the assumption of system linearity, while the majority of present-day systems still contain nonlinear elements.

At the lower data rates of the past, voltage noise was the dominant concern, leading to signal-to-noise ratio (SNR) boosting circuits like the matched filter and ISI canceling channel equalizers. But at multi-Gigabit/second (Gb/s) data-rates, the inherently short symbol period (i.e., unit interval (UI)) has shifted attention from voltage to time. And whereas noise budgets were once an essential part of the initial design specification, jitter budgets are now the more common focus. White this trend may appear to justify the independent analysis of amplitude noise and timing jitter when one of the two is the more dominant performance limiter, increased accuracy is still achieved when both noise components are considered simultaneously. Accordingly, an improved signal simulation technique would at least generate a full signal with both amplitude noise and timing jitter.

Another argument for developing full signals with amplitude noise and timing jitter, rather than maintaining independent noise and jitter models, is the impact of ISI. While unbounded Gaussian noise and jitter lead to long term bit errors, depending upon the bandwidth of the channel, ISI and the corresponding data-dependent jitter (DM) may dominate the short term signal degradation.

Finally, to be able to incorporate the anticipated impact of the channel directly into the input stimulus waveform at the time of signal generation can reduce simulation time significantly, as the mathematical process for computing the impact of the channel on the signal (convolution) is computationally intensive. Therefore, it would benefit circuit designers to avoid repeating such a calculation with each simulation. The disclosed techniques achieve such results in a manner implementable in a typical computerized system or other computerized circuit simulation software package.

DETAILED DESCRIPTION

Methods for generating realistic waveforms with noise in a computer-based simulation environment are disclosed. More specifically, one or more embodiments of the invention comprise computer implementable techniques for generating simulate-able waveforms (i.e., signals capable of being used in future simulations) without the need for repeated simulation of a full channel model. Such techniques include simulating the effect of a channel on a transmitted signal to obtain a received signal, which comprises differences between the signal as transmitted and as received. These differences are compiled into a statistical form, and are used to generate simulate-able waveforms that include the effects of amplitude noise and timing jitter, without the need for additional channel simulation. While embodiments of the invention are disclosed in which a signal is first simulated to record statistical differences, based on this disclosure, one skilled in the art will appreciate that such statistical differences may also be obtained from a physical channel. In other words, it is also possible to create a physical channel and to transmit a signal across the physical channel to detect and record a received signal, which may be sampled at particular points to obtain deviations similar to the simulated deviations.

While the terms 'signal' and 'waveform' both relate to a detectable quantity comprising, for example, a voltage or a current, one skilled in the art will appreciate that these terms are not significantly different. For purposes of convenience, a signal will be referred to herein as relating to the input of a waveform generation system, while a waveform will be referred to as relating to the output of the system. For example, a signal will be input to a system and measured, while a waveform will be generated and output by the system. Further, while the terms 'noise' and 'jitter' are used to describe amplitude noise and timing jitter, respectively, jitter may be regarded in a broader sense as a specific type of timing noise, as mentioned above.

Figure 1:
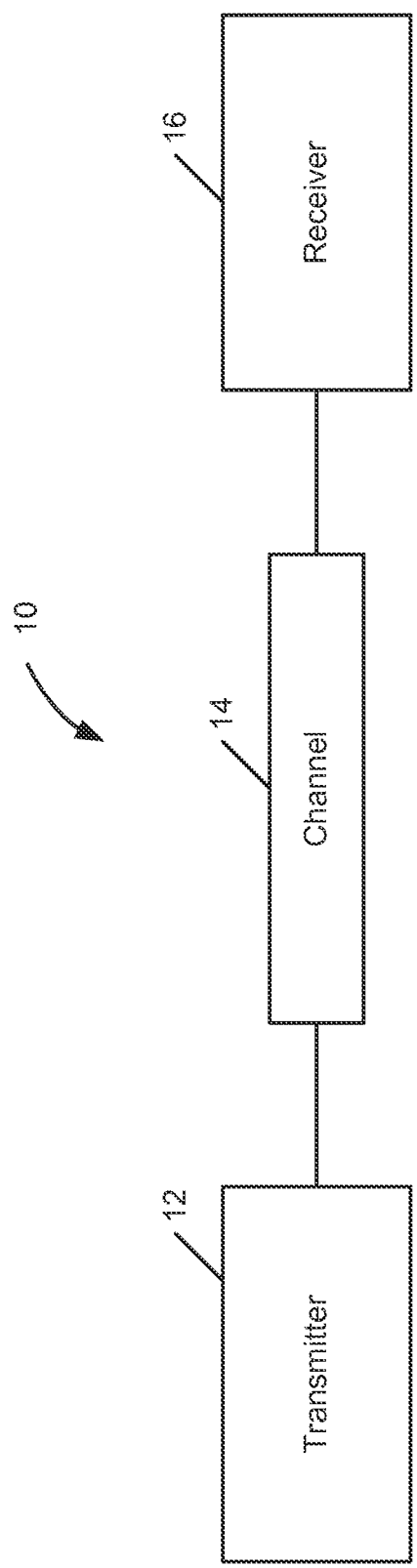
FIG. 1 illustrates a block diagram of a transmission system on a printed circuit board.
Figure 2:
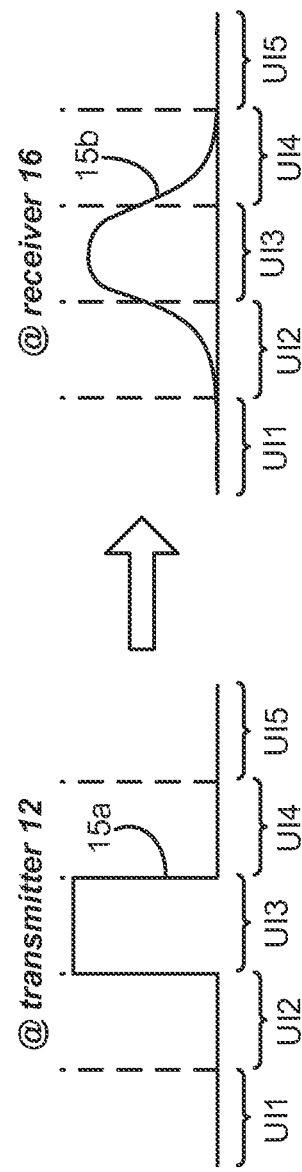
FIG. 2 illustrates the effect of a transmission channel on pulses sent across the channel.

A number of exemplary techniques are disclosed for generating waveforms in accordance with one or more embodiments of the invention. One such technique, shown in FIGS. 3A-3F, operates as follows, and is further summarized in the flow chart of FIG. 3G. In brief, the technique assumes that a simulation model of a channel 14 (See FIG. 1) has been created in software and that a non-ideal received signal 30b has been generated based on an ideal transmitted signal 30a (i.e., a signal that would be sent over the channel 14). A non-ideal received signal 30b may be generated based on a channel model, for example, according to the techniques described in U.S. patent application Ser. No. 11/549,646 (referenced above), which are not discussed in detail here. Alternatively, a physical system 10 may be constructed, comprising a physical channel 14 to be tested, and an ideal transmitted signal 30a may be transmitted across the channel 14. From the ideal transmitted signal 30a, a non-ideal received signal 30b may be detected and recorded, similar to the simulated received waveform discussed above. Alternatively, data representing a simulated or transmitted signal may be obtained from another source, such as from within a computer memory or file, through user input, etc.

Figure 3A:
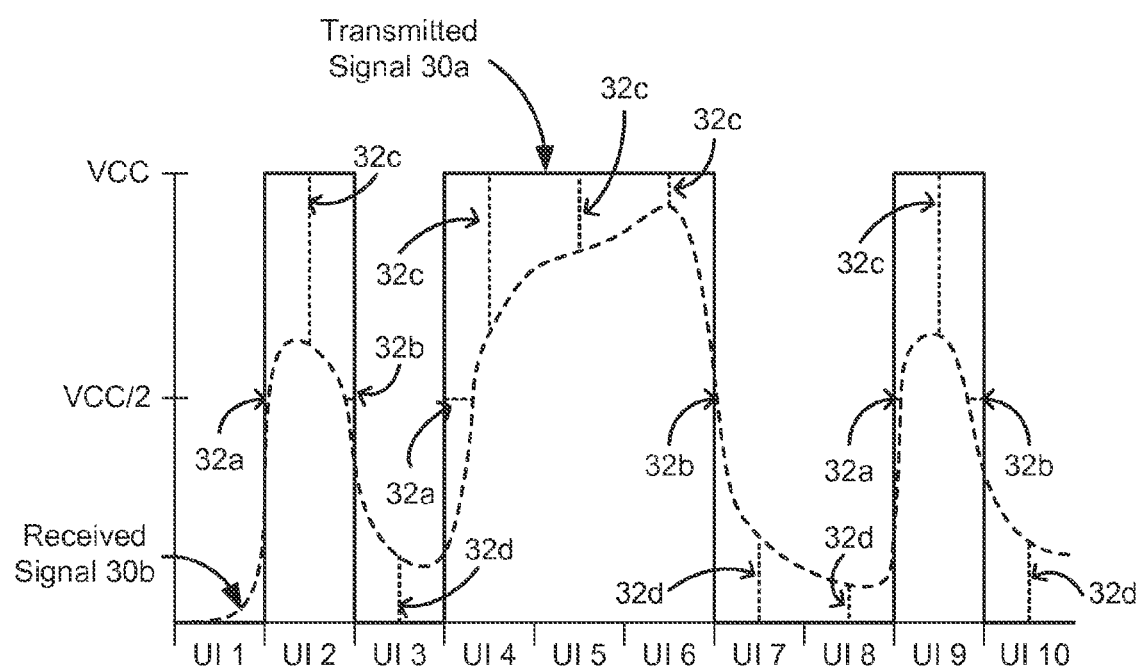
FIG. 3A illustrates an ideal transmitted signal and a corresponding received signal used to generate amplitude noise and timing jitter vectors in accordance with an embodiment of the invention.

In further detail, the ideal transmitted signal 30a is first simulated as being transmitted through the channel 14, and the non-ideal received signal 30b is obtained from the simulation. To create additional waveforms without additional simulation, the effect of the channel 14 is measured on the non-ideal received signal 30b at a number of sample values 32a-32d, which represent specific deviations between the simulated non-ideal received signal 30b and the ideal transmitted signal 30a. As shown in FIG. 3A, these sample values 32a-32d are sampled in the form of time values corresponding to the timing difference between an ideal transition and a received transition (e.g., 32a, 32b), in the form of voltage values once every unit interval (UI) (e.g., 32c, 32d). Where necessary, the timing edge (i.e., the time difference between an ideal transition and a received transition) of each transition may be determined by interpolating to the point where the signal crosses a designated threshold voltage (e.g., a midpoint reference voltage, such as VCC/2). The result of the sampling is that the amplitude of each received pulse is stored, as well as the timing edge of each transition. Although ten UIs are shown in FIG. 3A for purposes of example, any number of UN may be simulated. Typically, at least 1000 samples are obtained for each type of sample value 32a-32d.

The sample values 32 are denoted the rising edge deviation 32a (representing the timing difference between an ideal 'low-to-high' transition and a received transition), the falling edge deviation 32b (representing the timing difference between an ideal 'high-to-low' transition and a received transition), the '1' deviation 32c (representing the voltage difference between an ideal 'high' value and a received value), and the '0' deviation 32d (representing the voltage difference between an ideal 'low' value and a received value). One skilled in the art will appreciate that it is not strictly necessary to obtain these specific deviations. And, as will be explained in further detail below, other deviations may be collected that are not presently discussed. These deviations 32 are then used to statistically generate one or more non-ideal waveforms based on user-defined ideal waveforms, which may be, for example, inputted into a computer system. The generated non-ideal waveforms may thus be formed based on the deviations obtained from a single non-ideal received signal 30b, without the need for additional simulation on a computer system.

Figure 3B:
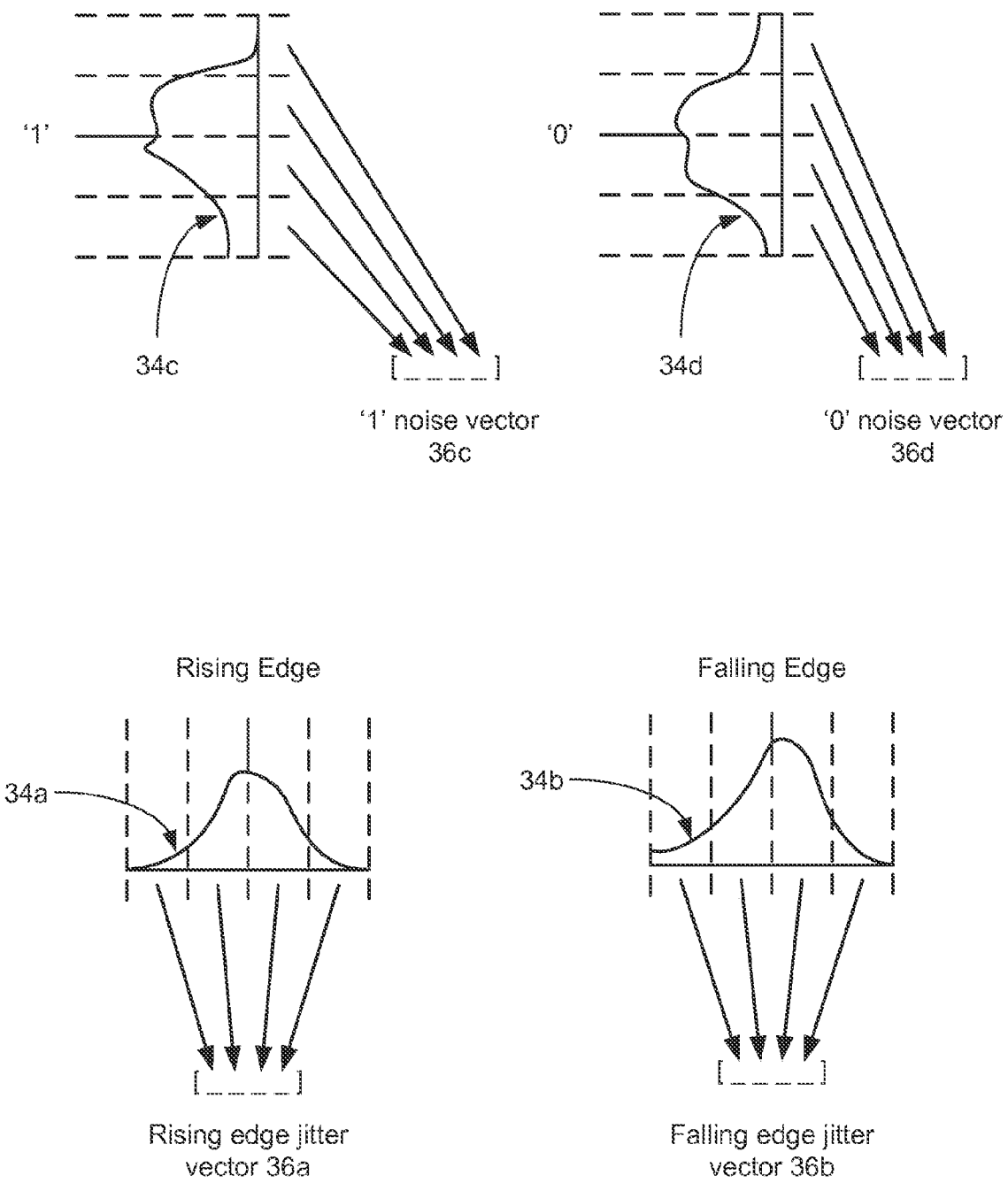
FIG. 3B illustrates the derivation of amplitude noise and timing jitter vectors in accordance with an embodiment of the invention.
Figure 3C:
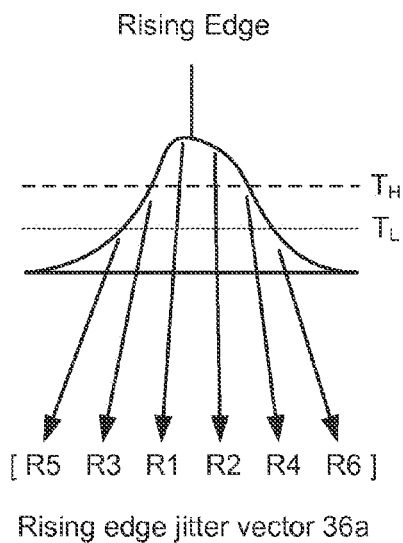
FIG. 3C illustrates the derivation of a timing jitter vector in accordance with an embodiment of the invention.

In further detail, each of the obtained sample values 32a-32d relate to a particular characteristic of the non-ideal received signal 30b (i.e., a particular difference between the non-ideal received signal 30b and the ideal transmitted signal 30a), as discussed above. As shown in FIGS. 3B and 3C, each particular type of sample value 32a-32d is used to form a probability density function (PDF) 34a-34d, representing the probability distribution of a particular difference between the ideal transmitted signal 30a and the non-ideal received signal 30b, as caused by the channel 14. In other words, each PDF 34a-34d represents a statistical set of possible values of noise for a received signal value (e.g., '1' or '0') or timing jitter encountered during a transition between received signal values (e.g., rising edge or falling edge jitter). For example, every rising edge sample value 32a is used to form a rising edge PDF 34a and a rising edge jitter vector 36a. Similarly, every '1' sample value 32c is used to form a '1' PDF 34c and a '1' noise vector 36c.

Mathematically, the PDF of a random variable represents the probability that the random variable lies within an infinitely small interval of a function representing the sample space of the random variable. The PDF of a random variable is well understood by one of ordinary skill in the art and will not be discussed in great detail. The PDFs 43a-34d may be generated in a number of manners. For example, as shown in FIG. 3B, sampled values 32a-32d may be arranged into statistical bins, from which a PDF 34a-34d is formed. Other operations, such as interpolation of the sample values 32a-32d, may also be performed to obtain PDFs.

From the PDFs 34a-34d, amplitude noise and timing jitter vectors 36a-36d are formed, from which waveforms may be generated. Like the PDFs discussed above, the vectors 36a-36d may also be created in a number of manners. For example, values may be taken from the PDFs 34a-34d such that the elements of the vectors 36a-36d more likely to occur are used before other deviations. More specifically, as shown in FIG. 3C, one or more thresholds (T H, T L) may be used to place a value from a PDF (e.g., the rising edge PDF 34a) into a corresponding vector (e.g., rising edge jitter vector 36a). The use of thresholds, as shown in FIG. 3C, allows values with higher probabilities from the PDFs 34a-34d to become elements of the vectors 36a-36d before values with lower probabilities. Alternatively, values from the PDFs 34a-34d may be randomly selected to generate elements of the vectors 36a-36d.

The resulting vectors 36a-36d form a reference set of ISI and timing jitter values that may be independently applied to generate waveforms, based on an ideal bit sequence (e.g., an ideal bit sequence comprising ideal voltage and time values that are specified by a user). While a value from a PDF may be directly applied to the generation of a non-ideal waveform 38a (FIG. 3D) without forming a vector 36, in one or more embodiments of the invention, the non-ideal generated waveforms 38a are formed from the vectors 36a-36d. Specifically, elements from vectors 36a-36d are used to create segments of the non-ideal generated waveform 38a (i.e., a rising edge, a '1' value, etc.). A full discussion of the generation of such a piecewise waveform is available, for example, in U.S. patent application Ser. No. 11/549,646 (referenced above). Accordingly, the construction of such a waveform is only briefly outlined here.

Bit sequences may be specified in a number of manners. For example, a computer system may have a number of ideal bit sequences that a user is likely to select for a non-ideal generated waveform 38. Such bit sequences may include, for example, periodic bit sequences, sinusoidal bit sequences, an ideal high signal comprising a plurality of '1' values, a random bit sequence, etc. Other bit sequences may comprise values specified and input by a user, which may be used as a template to generate the non-ideal waveforms 38. These bit sequences may also be input as piecewise functions. In one embodiment according to the invention, the specified bit sequences comprise timing and voltage characteristics of an ideal bitstream, i.e., a series of bits with ideal (voltage) signal and (timing) transition values.

Figure 3D:
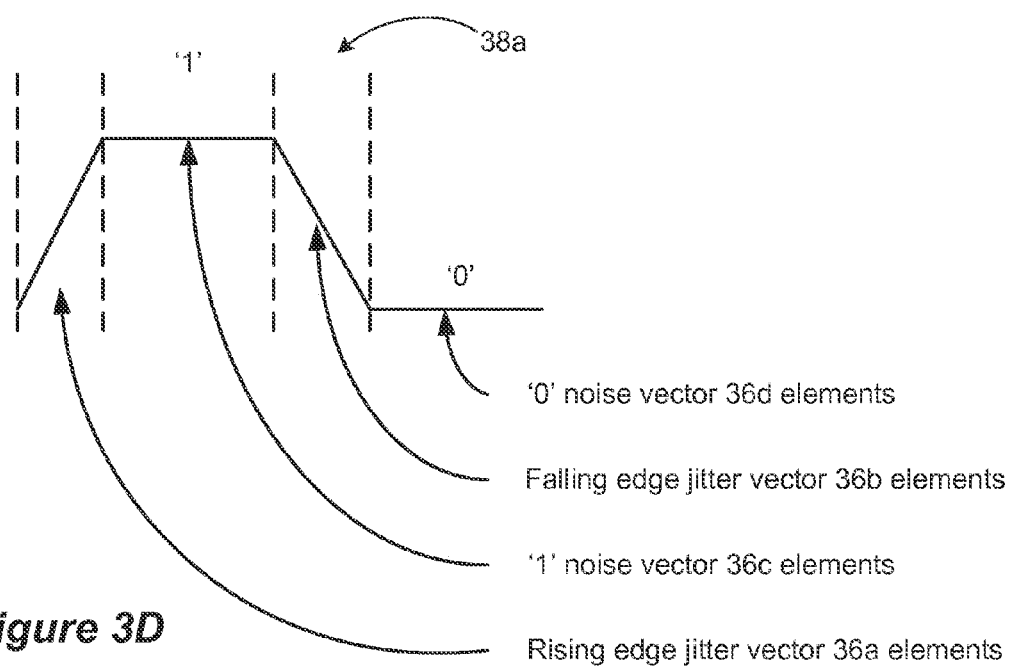
FIG. 3D illustrates the simulation of a single cycle of an amplitude noise and timing jitter modified waveform in accordance with an embodiment of the invention.

As shown in FIG. 3D, elements from each vector 36a-36d are used to form the first two bits ('0', '0') of a non-ideal generated waveform 38a, as well as the transitions from tow to high and from high to tow. To create a non-ideal generated waveform 38a, each necessary component of the waveform (e.g., a rising edge, a '1' value, etc.) is taken from an appropriate amplitude noise or timing jitter vector 36a-36d. Each element from a vector 36a-36d is selected randomly, without replacement, until the required number of unit intervals have been accounted for in the non-ideal generated waveform 38a. Utile number of required unit intervals exceeds the sample vector size available, a vector 36a-36d may be re-used after all elements in the vector have been exhausted.

Figure 3E:
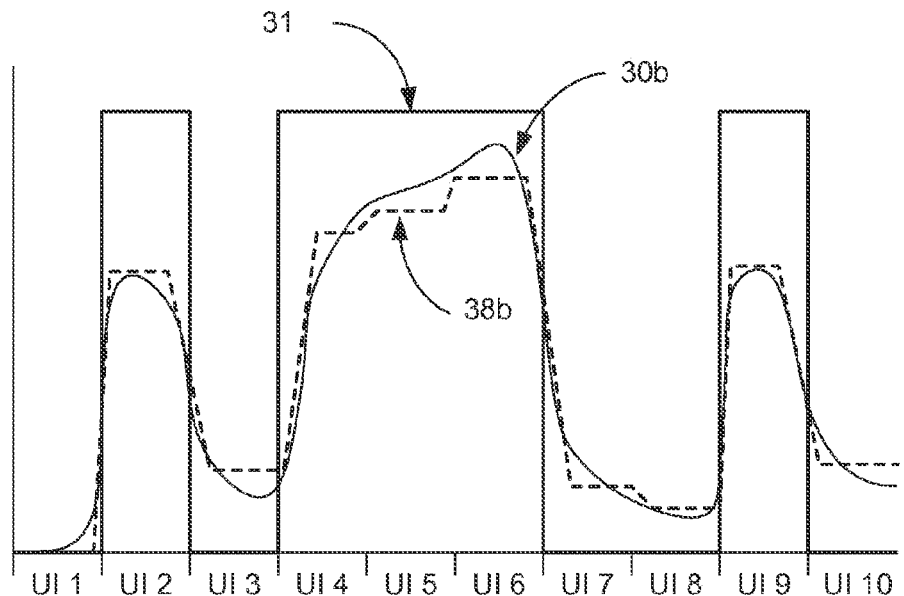
FIG. 3E illustrates the generation of an amplitude noise and timing jitter modified waveform in accordance with an embodiment of the invention.
Figure 3F:
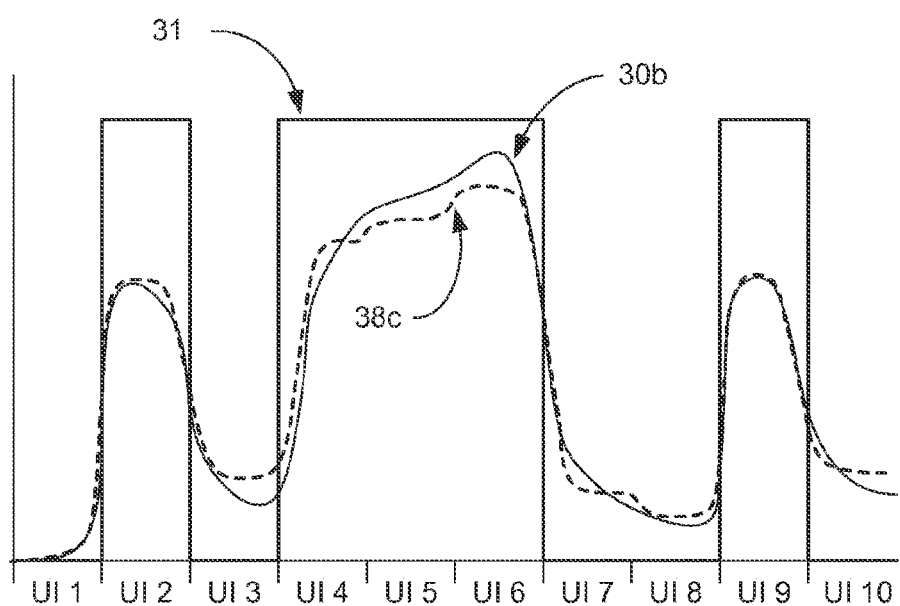
FIG. 3F illustrates a modification of the amplitude noise and timing jitter modified waveform of FIG. 3E.
Figure 3G:
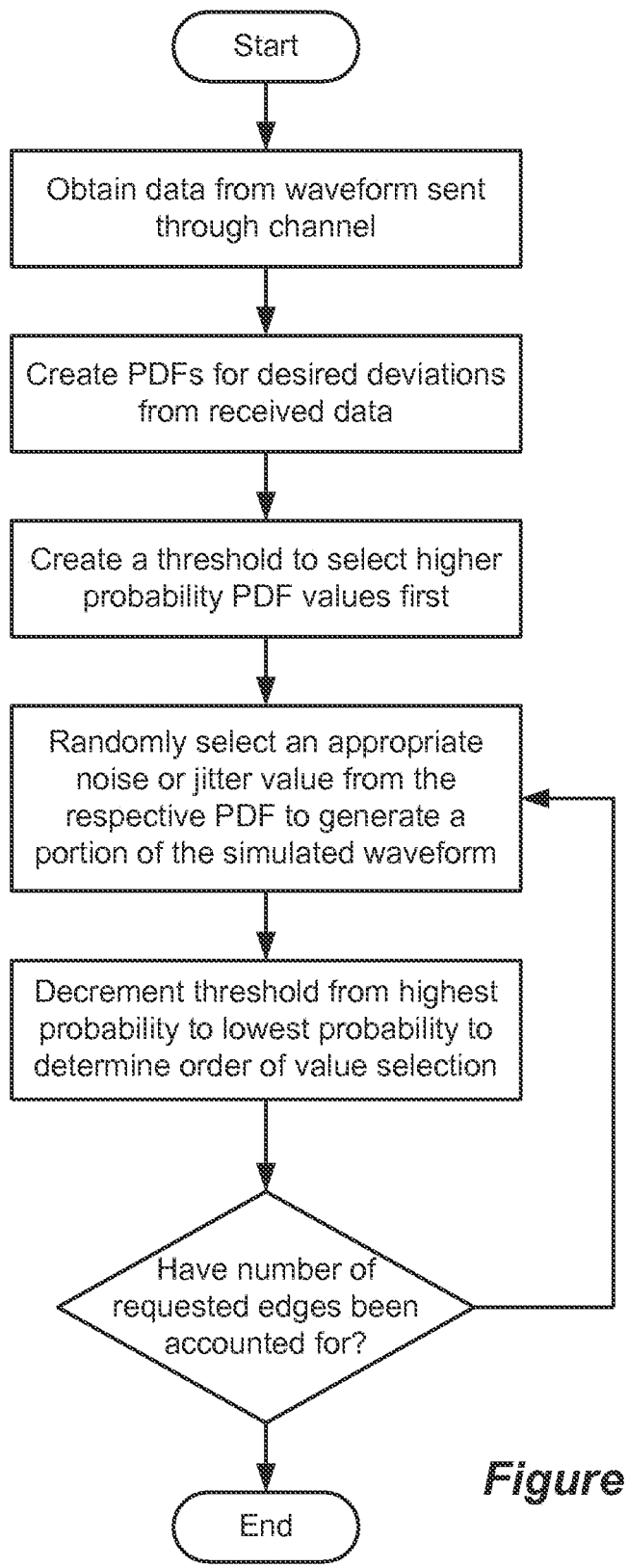
FIG. 3G illustrates a computer-implementable flow chart illustrating an embodiment of the invention.

The above process is repeated until a non-ideal generated waveform 38b of a desired length is formed based on a bit sequence 31, as shown in FIG. 3E. Thus, from the elements in the vectors 36a-36d, non-ideal waveforms may be generated, based on a bit sequence 31, without the additional computational expense of repeatedly simulating the channel response. The non-ideal generated waveform 38b may additionally be modified as desired by the designer. For example, as shown in FIG. 3F, the non-ideal generated waveform 38b is filtered to smooth the transitions created by the joining of elements from the vectors 36a-36d, resulting in the filtered non-ideal generated waveform 38c. Smoothing the waveform in this manner allows a designer to create a more realistic waveform resembling the bit sequence 31 that may more closely resemble an actual non-ideal received signal (e.g., 30b) after it is transmitted across a channel 14.

Additional modifications of the above technique are also possible. For example, while the above technique incorporates pattern-dependent timing jitter, a designer may wish to incorporate random timing jitter, or other forms of deterministic timing jitter, into the PDFs 34a-34b. This may be accomplished, for example, through the mathematical process of convolving the desired timing jitter distribution with the appropriate timing jitter PDF 34a-34b, additional statistically defined voltage noise may be incorporated through convolution with the appropriate amplitude noise PDF 34c-34d. Further, while the development of the PDFs 34a-34d is discussed in detail above, the vectors 36a-36d, or non-ideal generated waveforms 38 may be generated from the deviations 32a-32d without the generation of the PDFs 34a-34d.

Although the above embodiments of the invention primarily discuss a signal that is simulated to produce simulate-able waveforms, it is also possible to create a physical system 10 comprising a real channel 14 to be tested, and to send a signal (i.e., an ideal transmitted signal 30a) across the real channel 4. From one or more signals sent across the channel 14, a received signal may be detected and sampled to obtain sampled deviation values 32a-32d, discussed above, from which PDFs 34a-34d and non-ideal generated non-ideal waveforms 38 may be formed. Further, data representing a simulated or transmitted signal may be obtained from an alternate source, such as from within a computer memory or a computer file, through user input, etc. In other words, previously transmitted or simulated signals may also be used.

In the technique shown in FIGS. 3A-3G, a real or simulated signal is measured to obtain sample values, which are then compiled into statistics. As an alternative to simulating and measuring a signal to obtain statistics, statistical methods can be utilized to reduce the number of required waveform samples. FIGS. 4A-4D show a second technique for generating a non-ideal waveform in accordance with one or more embodiments of the invention, which is further summarized in the flow chart of FIG. 4E. In brief, the technique comprises creating a PDF from a system or channel pulse response. Such a PDF may be formed, for example, by generating a statistical eye diagram from the system or channel pulse response, which will be discussed in detail below. An eye diagram may be created, for example, as discussed in the document by Casper et at, "An accurate and Efficient Analysis Method for Multi-Gb/s Chip-to-chip Signaling Schemes," in Proceedings of IEEE Symposium on VLSI Circuits, pp. 54-55, June 2002, which is incorporated herein by reference in its entirety. Similar to the technique discussed with reference to FIGS. 3A-3G, vectors 36a-36d may be created from the PDFs 34a-34d, which are then used to create generated waveforms, without the need for additional channel simulation or for sending signals across a channel. While the generation of eye diagrams is described in the following discussion, it should be understood that the generation of such eye diagrams is not necessary to generate PDFs or vectors that may be used to generate non-ideal waveforms 38.

In the second technique, a statistical eye diagram may be generated from a system Or channel pulse response. A channel pulse response may be generated from, for example, the superposition of rising and falling edge channel step responses or through the convolution of the channel impulse response with an ideal pulse. While the process by which the statistical eye is generated has several variations, this concept is universal and well understood to one of ordinary skill in the art.

Figure 4A:
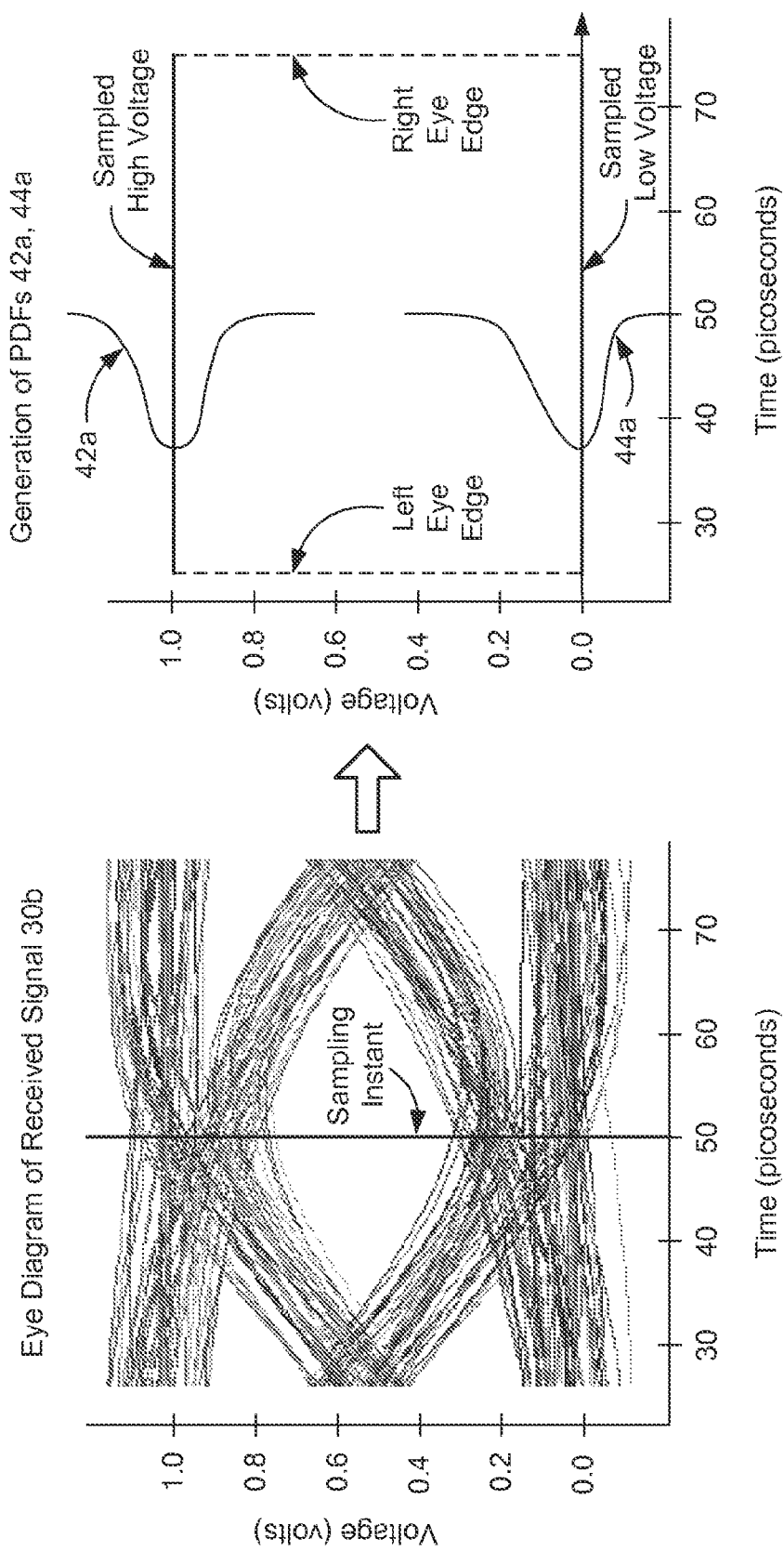
FIG. 4A illustrates the generation of a noise probability density function (PDF) of an eye diagram.

An example of an eye diagram gathered through transient simulation is shown in the left half of FIG. 4A. As discussed in detail in Casper et al, the process for generating the statistical eye begins by sampling the channel-affected pulse response (i.e., anon-ideal received pulse) at every sampling instant (e.g., at 1 UI intervals). These samples represent the UI of interest and all potential ISI terms. Each of the ISI samples are recursively convolved together to form an ISI PDF. This PDF is further convolved with both the sampled high voltage ('1') and the sampled low voltage ('0') to produce two PDFs 42a, 44a, representing the probability distribution of either a received 'one' or a received 'zero,' respectively. The process may be repeated to incorporate sampled crosstalk values, thereby increasing the accuracy and generality of the model.

Figure 4B:
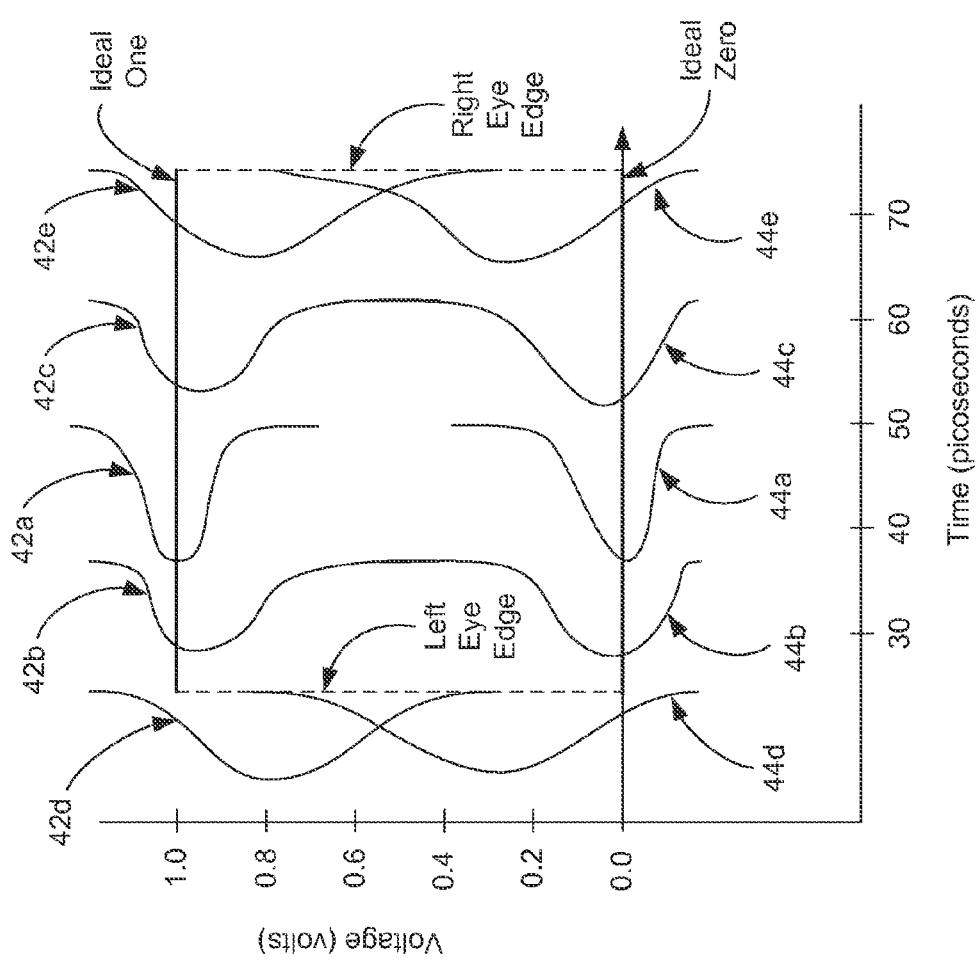
FIG. 4B illustrates the generation of multiple noise PDFs of the eye diagram shown in FIG. 4A.
Figures 4C, 4D:
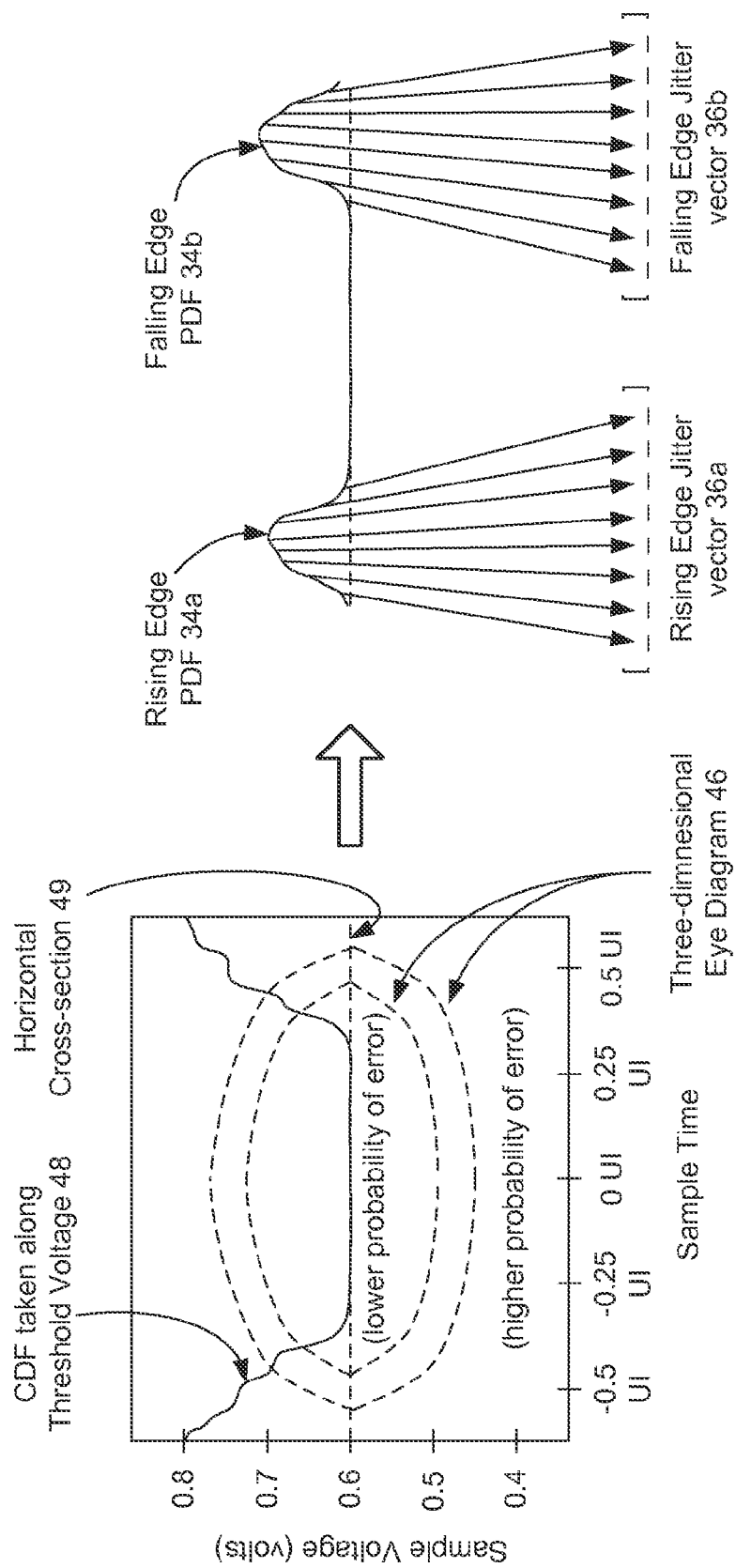
FIG. 4C illustrates the generation of a cumulative distribution function (CDF) and a horizontal timing jitter cross-section along a threshold voltage of an eye diagram in accordance with an embodiment of the invention.
FIG. 4D illustrates the generation of rising edge jitter and falling edge jitter from PDFs generated from the CDF shown in FIG. 4C.
Figure 4E:
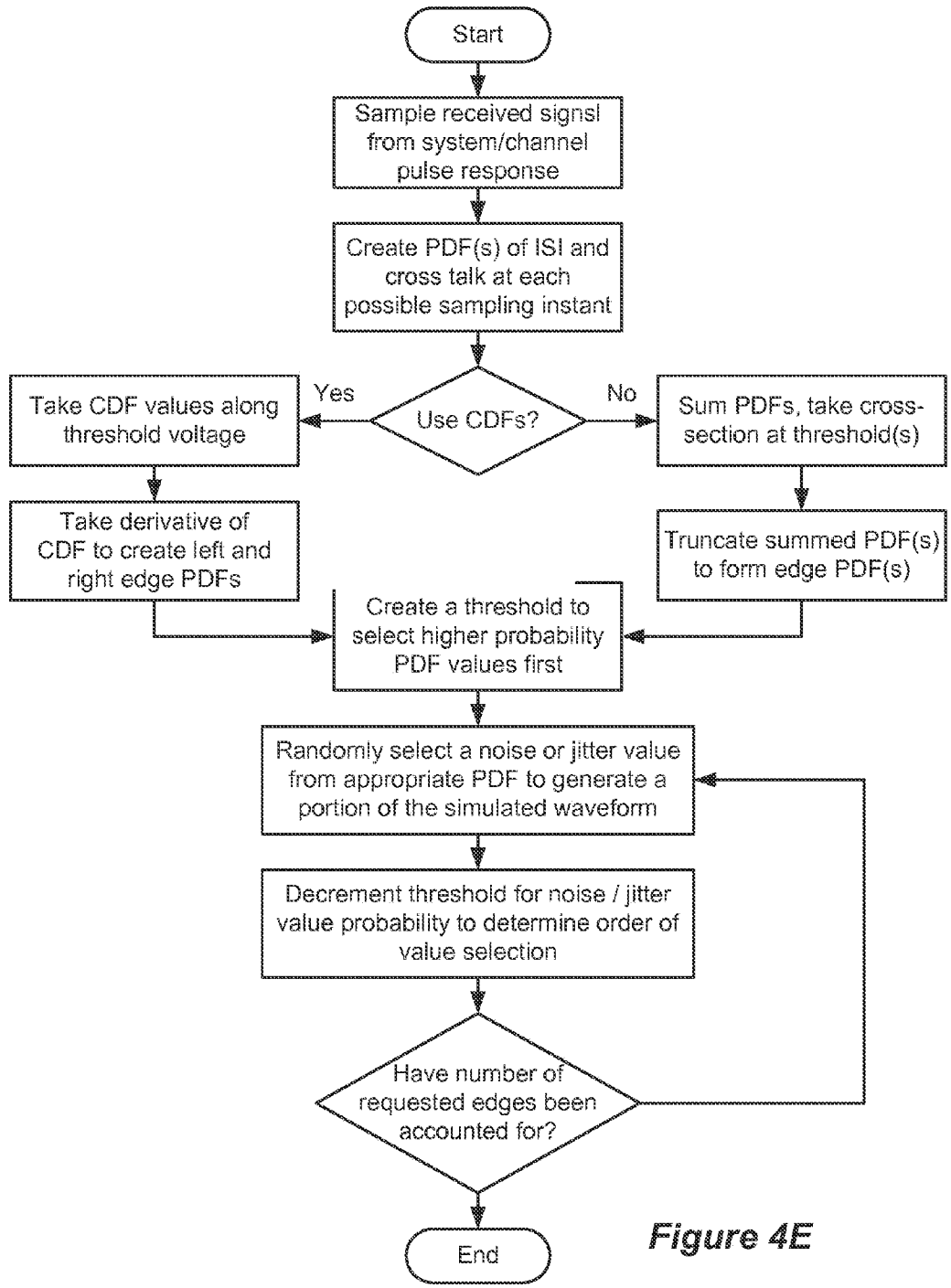
FIG. 4E illustrates a computer-implementable flow chart illustrating an embodiment of the invention.

While the process just described produces PDFs of the received 'ones' and 'zeros' at a particular sampling instant (e.g., 50 ps), or a vertical cross-section of the eye as illustrated in FIG. 4A, which will later serve as the basis for choosing the amplitude (i.e., '1' or '0') of a generated waveform on a cycle-to-cycle basis, as discussed below, the process may also be repeated while sweeping the sampling instant across the width of the eye, as shown in FIG. 4B. For example, the process of generating the ISI/crosstalk PDFs 42, 44 may be repeated in picosecond steps across the width of the eye. Similarly, as shown in FIG. 4C, PDFs corresponding to the left and right edge jitter may be extracted from the set of amplitude noise PDFs by summing the '1' and '0' noise PDFs at each time step and then simply taking a horizontal cross-section 49 of the summed vertical noise PDFs at one or more specified voltage thresholds (VCC/2, for example). The summed PDFs may then simply be truncated to form rising and falling edge PDFs 34a, 34b.

It should be pointed out that the described process adds particular steps, all of which may not be necessary. While all of the described steps may not be necessary according to particular embodiments of the invention, it is anticipated that future simulation tools may provide the statistical eye as a starting point. Thus, it is prudent to provide a process that builds off of that existing resource.

Rather than summing the PDFs 42, 44, a three-dimensional eye diagram 46 may be formed as shown in FIG. 4C, where the third dimension represents the probability of error at a given sample time and sample voltage. This is accomplished by computing the cumulative distribution function (CDF) of each PDF by integrating each of the '1' PDFs (from –infinity to +infinity) and each of the '0' PDfs (from +infinity to –infinity) and then summing the resulting CDFs at each timestep across the eye. Mathematically, the CDF describes the probability of a random variable, i.e., the probability that an event is less than or equal to some value. Further, in general terms, the PDF of a random variable is the mathematical derivative of the CDF of the random variable. Like the PDF theory discussed briefly above, the CDF of a random variable is understood by one of ordinary skill in the art and will not be discussed in great detail. In any event, such a three-dimensional eye diagram 46 may be used in a number of manners to form timing jitter vectors 36.

In one embodiment, the timing jitter vectors 36a, 36b are formed by first computing the CDF 48 along a threshold voltage (0.6 volts, in this example), which may require no more than sampling and tabulating the probability values in a horizontal cross-section of the statistical eye. In other words, a horizontal cross-section of the statistical eye is taken. In this way, the timing of the threshold voltage crossing may be viewed as a random variable, for which a particular CDF is derived. Then, the derivative of the CDF 48 is taken to form PDFs 34a, 34b of the left and right edges (i.e., the rising and falling edges) of the three-dimensional eye diagram, as shown in FIG. 4D.

These rising and falling edge PDFs 34a, 34b may be used to generate rising and falling edges of non-ideal generated waveforms 38. More specifically, as discussed above with respect to FIGS. 3B and 3C, timing jitter vectors 36a, 36b may be formed for rising and falling edges by selecting values from the rising and falling edge PDFs 34a, 34b. As this technique was discussed above with respect to FIG. 3B, specific details will not be repeated here.

Similarly, amplitude noise vectors 36c, 36d may be formed by computing the CDF 48 along a threshold time (e.g., a midpoint timing reference such as 0 UI in FIG. 4C). Similar to the timing jitter vectors 36a, 36b discussed above, this may be accomplished by sampling and tabulating the probability values in a vertical cross-section of the statistical eye. Then, the derivative of the CDF 48 may be taken to form PDFs 34c, 34d of '1' and '0' noise, that is, PDFs of amplitude noise.

From the timing jitter vectors 36a, 36b and/or amplitude noise vectors 36c, 36d, and an ideal bit sequence input into the computer system (e.g., by a user), a non-ideal generated waveform 38, similar to the waveforms of FIGS. 3D-3F, may be generated. Accordingly, the discussion of such a generated waveform is also not repeated here.

FIGS. 5A-5D show a third technique for generating a waveform in accordance with one or more embodiments of the invention. This technique relies on the premise that similar signal patterns exhibit similar characteristics in terms of noise (crosstalk, LSI, etc.). This technique is further summarized in the flow chart of FIG. 5E. In brief, the technique comprises determining a region of influence a received bit pattern and applying deviations resulting from the region of influence to the generation of a non-ideal waveform. In other words, a number of UIs preceding and trailing a UI of interest have an impact on the UI of interest, and this feature is used to determine how much of a signal affects each transmitted bit. Based on the number of Ins affecting each UI of interest, a series of bit sequences are sent or simulated through a channel 14 to account for all possible bit combinations that would lead to ISI affecting a particular UI. From a simulated series of transmitted bit sequences, deviations may be collected for the UI of interest to create any number of generated waveforms without the need for simulating additional signals across the channel.

To explain further, for a given in which a bit is transmitted, ISI resulting from the transmitted bit may affect a number of UIs preceding or following the bit. For example, in FIG. 5A, a bit of the ideal transmitted signal 30a is transmitted in UI 1, which results in a non-ideal received signal 30b, which is spread across UI 1 to UI 4 in total. Thus, it may be concluded for the example of FIG. 5A that for each UI comprising a received bit, the bits transmitted during the three UIs preceding that UI (the region of influence) may have influenced the received bit in terms of ISI. The bit values in these three preceding UIs may be viewed as dominant ISI contributors for the UI of interest. To illustrate further, if another bit were transmitted in UI 4, effects of ISI in UI 4 could not be fully accounted for without considering the bit(s) UI 1-UI 3. The region of influence may be dependent on a number of factors, including, for example, one or more channels 14, or the physical bandwidth of the channel of interest, etc.

In order to account for these influences, a series of bit patterns may be simulated, and deviations may be collected for a UI of interest (e.g., UI 4), where the UI of interest and the region of influence are part of each bit pattern. It will become apparent that as a given received UI may comprise a '1' value or a '0' value, and there are three bits preceding the bit of interest (resulting in four total bits) in the example shown in FIG. 5A, that 16 bit patterns must be evaluated to collect all possible deviations for the UI of interest. Further, while this particular bit pattern comprises 4 UIs, such a bit pattern may comprise any number of UIs, where the UI of interest is any UI within the bit pattern. Practical limitations may exist, of course, as increasing the length of the bit pattern necessarily increases the number of bit patterns that must be evaluated, and accordingly, processor and memory use, simulation time, etc.

Figure 5A:
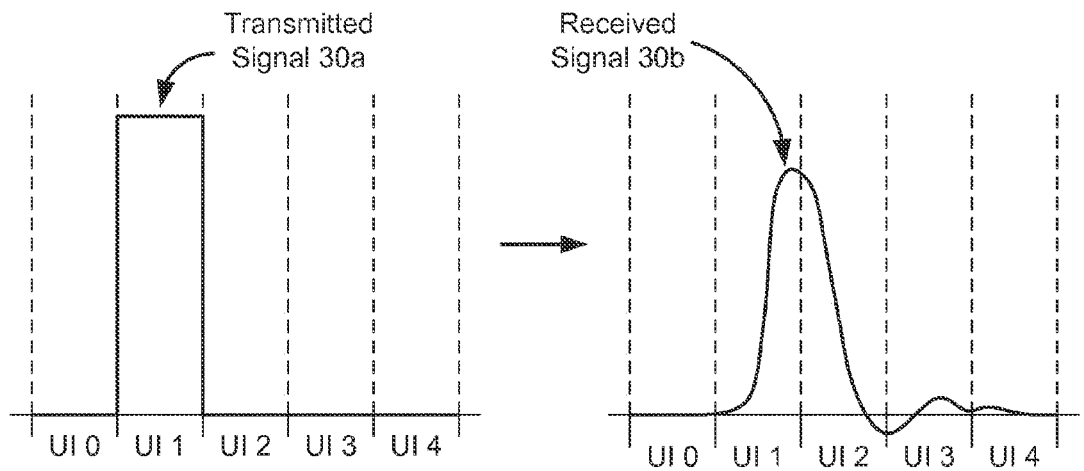
FIG. 5A illustrates an ideal transmitted signal and the resulting received dispersed signal in accordance with an embodiment of the invention.
Figure 5B:
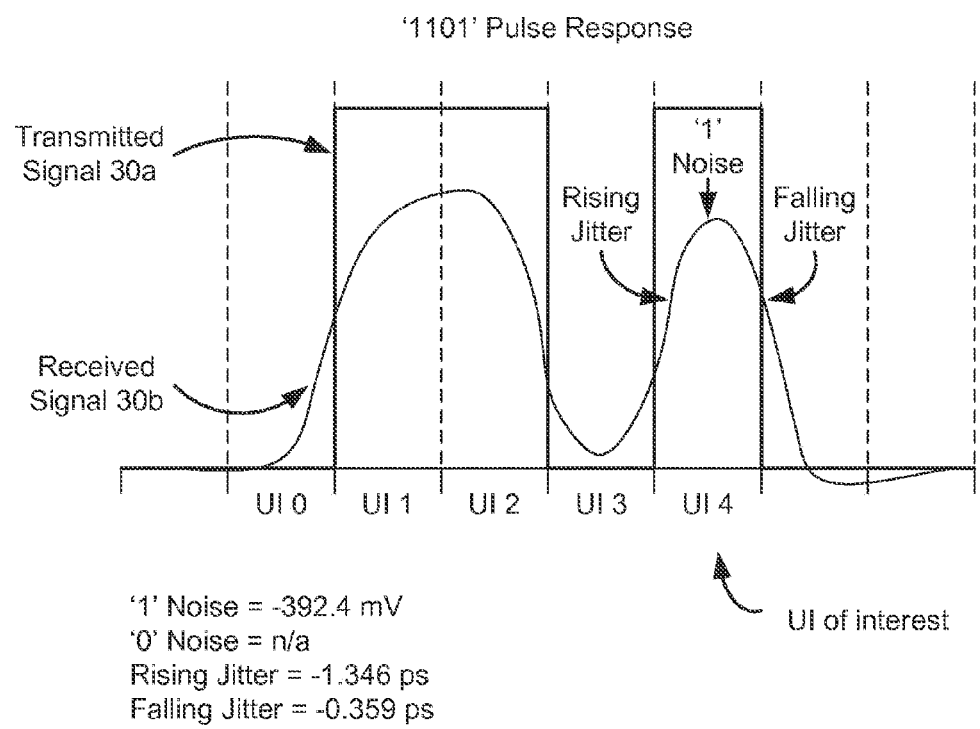
FIG. 5B illustrates generating simulation deviations in accordance with an embodiment of the invention.

Based on the example shown in FIG. 5A, an exemplary bit pattern from which deviations are collected is shown in FIG. 5B. In FIG. 5B, a '1101' bit pattern (an ideal transmitted signal 30a) is simulated across a channel 14. Thus, the UI of interest (UI 4) of the ideal transmitted signal 30a follows a specific pattern of bits ('110'), which results in a set of deviations that may be collected from the non-ideal received signal 30b. Naturally, this set of deviations may differ when different bit patterns precede the UI of interest (e.g., '010' as compared to '110,' etc.). Further, deviations collected for bit patterns that differ only by the UI of interest (e.g., '0100' and '0101,' etc.) may result in different deviations collected for the of interest. However, for every identical transmitted bit pattern (i.e., for every '1101' bit pattern), a similar set of deviations is expected for the non-ideal received signal Mb. For example, as shown in FIG. 5B, the bit in UI 4, or the of interest, has a '1' noise value of −392.4 mV, which indicates that the value of the non-ideal received signal 30b is 392.4 mV lower than an ideal bit in the ideal transmitted signal 30a. A similar '1' noise value would be expected in UI 4 for every '1101' bit pattern that is simulated in the channel 14 used for the example shown in FIGS. 5A-5B.

All bit patterns over the length of the pulse dispersion (in this case, four UIs) are simulated to obtain non-ideal received signals 30b or sent across a channel and sampled as non-ideal received signals 30b. Accordingly, in this example, sixteen binary signals ranging from '0000' to '1111' are simulated. From these non-ideal received signals 30h, the aforementioned deviation sample values 32 are recorded. To approximate the signal amplitude of a UI of interest, the deviation of the received or simulated non-ideal received signal 30b from the ideal transmitted signal 30a may be measured at the center of the UI of interest. To approximate the jitter of a UI of interest, the deviation of the threshold crossing of the non-ideal received signal 30b from the ideal transition time may be measured. Such a threshold may be determined, for example, by taking the mean amplitude of a '101010 . . . ' pattern, or at one-half of the power supply voltage (VCC/2). Thus, for the example shown in FIGS. 5A-5B, a look-up table 50 of the sixteen different bit pattern combinations may be populated with characteristic influences on the UI of interest, as shown in FIG. 5C.

Figure 5C:
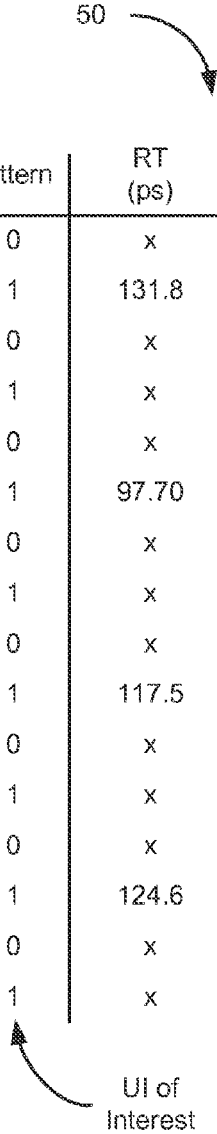
FIG. 5C illustrates tabulated simulation deviations in accordance with an embodiment of the invention.

In FIG. 5C, deviations for the sixteen possible bit patterns have been recorded, where the last bit in each bit pattern represents the UI of interest. For each bit pattern, recorded deviations include a rise time RT, a fall time FT, a timing jitter, a noise, and a '0' noise. At a minimum, a '1' or '0' noise value and a timing jitter value, if a transition occurs, would be expected for the look-up table 50, although rise times and fall times have also been included in this example. While many values in the look-up table 50 represent a deviation from the ideal transmitted signal 30a (the rise time and fall time values are absolute, rather than deviations), the values that are not affected by a particular sequence are given an 'x' value. For example, in the '0001' bit pattern, there is no falling time or '0' noise, as the final transition is a 'low-to-high' transition. Each bit pattern comprises at most a single timing jitter value because only the first edge transition, if present, needs to be considered for the bit pattern (i.e., the second edge transition, if present, would actually be equivalent to the first edge transition of the next UI).

The signal degrading phenomenon of crosstalk may also be accounted for in a similar way. To do so, the characteristics of the UI of interest must be measured not only for every possible set of patterns expected to impact it directly, but for similar pattern sets on neighboring signal traces. While this wilt add to the accuracy of the final generated waveform, it also dramatically increases the number of preliminary simulations or measurements that must take place, and the corresponding amount of data that is simulated and recorded. The addition of crosstalk also will slow down the signal generation time as the formation of each bit will not only require consideration of the surrounding bits in the given bitstream, but also the combination of bits in parallel bitstreams. Regardless, such an extension of the disclosed embodiment is possible.

Figure 5D:
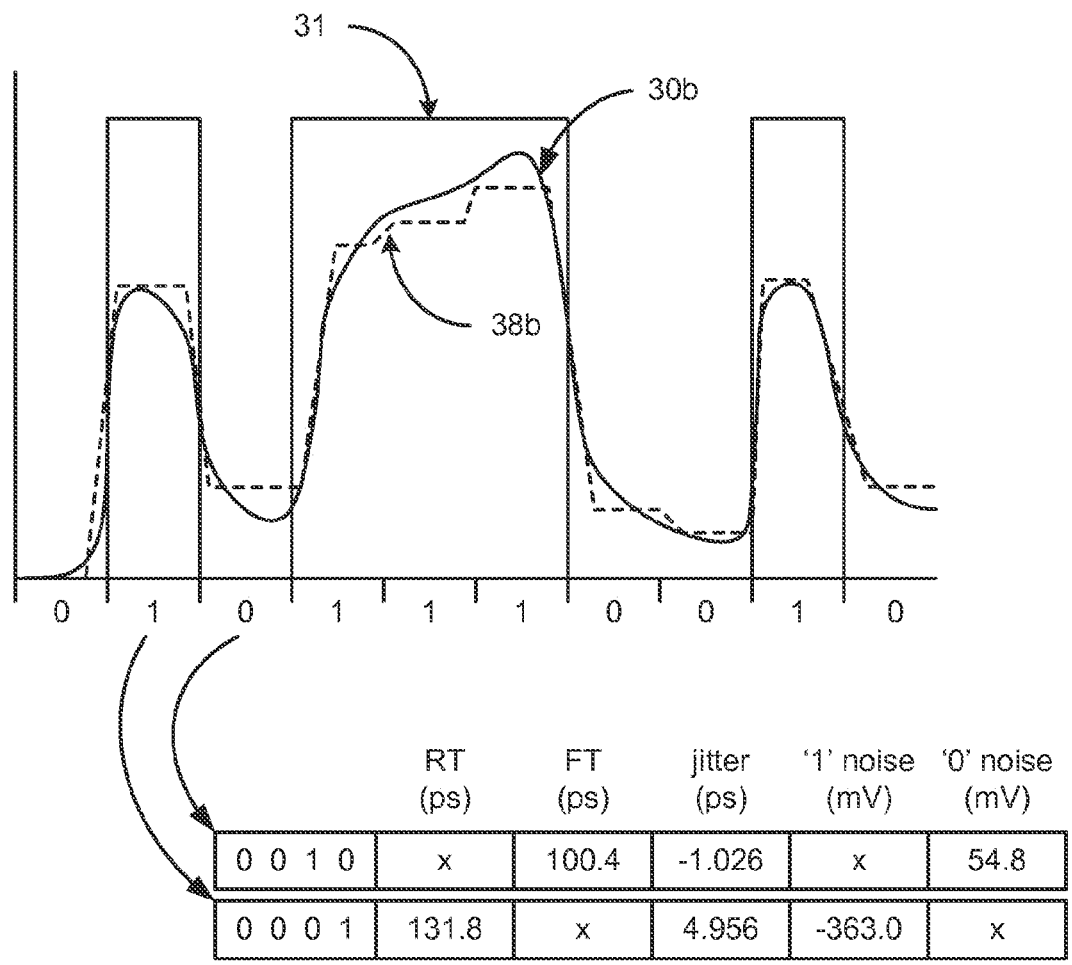
FIG. 5D illustrates the generation of an amplitude noise and timing jitter modified waveform in accordance with an embodiment of the invention.
Figure 5E:
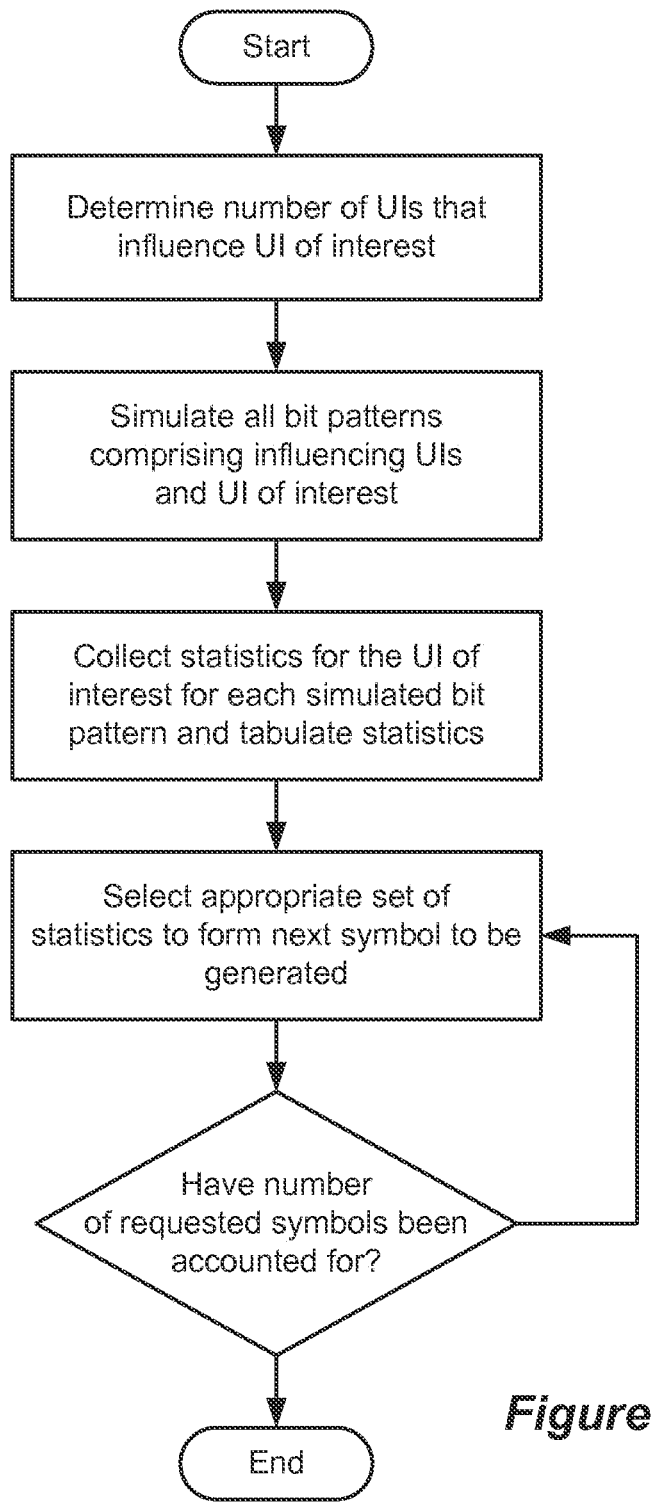
FIG. 5E illustrates a computer-implementable flow chart illustrating an embodiment of the invention.

From the deviations collected in the look-up table 50, arbitrary waveforms may be generated, accounting for ISI and crosstalk, without actually simulating the channel again. To do so, an ideal bit sequence 31 is input, for example, by a user, and a non-ideal generated waveform 38b is generated in the manner discussed above, using the voltage and timing characteristics in the look-up table 50, with the exception that the last three bits (i.e., the region of influence) in a waveform must be considered in order to generate each subsequent bit. For example, as shown in FIG. 5D, to generate a '0101110010' pattern, first the characteristics from the '0001' bit pattern are used to form the first '1' value in the sequence. Then, the characteristics from the '0010' bit pattern are used to for the subsequent '0' value in the sequence, and so on, until the generated waveform is fully formed (it is simply assumed that the '0101110010' bit pattern is preceded by two '0' values). Of course, this generated waveform may be filtered, as also discussed above. In conclusion, for every bit in a proposed signal to be simulated, the impact of the channel response can be constructed from a look-up table 50, without simulating the signal, or sending a physical signal across a channel 14. The look-up table 50 is constructed by recording the effect of all possible combinations of bits on a current bit and tabulating the results.

Numerous variations are of course possible with respect to the technique shown in FIGS. 5A-5C. For example, while a single set of deviations are collected for each bit sequence in the look-up table 50, any number of deviations may be collected, and the results, for example, averaged to generate averaged deviations. Alternatively, for each value in the look-up table 50, a set of deviations (i.e., a vector) may be generated, from which non-ideal generated waveforms 38 may be generated. Further, similar to the convolution of the PDFs discussed above, other forms of amplitude noise and timing jitter may be added into the deviations to account for other noise sources in the system 10. Further, although a particular example has been discussed in FIGS. 5A-5D having a single bit influenced by signal values in three prior UIs, one skilled in the art will appreciate that any number of bits preceding or subsequent to the bit of interest may similarly affect the bit of interest, including bits on neighboring traces. Further, one skilled in the art will appreciate that a look-up table 50 may be implemented in a number of manners, and is not restricted to the form described in FIG. 5C. In general terms, a table need only comprise the necessary elements shown in FIG. 5C. For example, a look-up table 50 may be implemented as a data structure comprising a vector or an array in a computer system.

Figure 6:
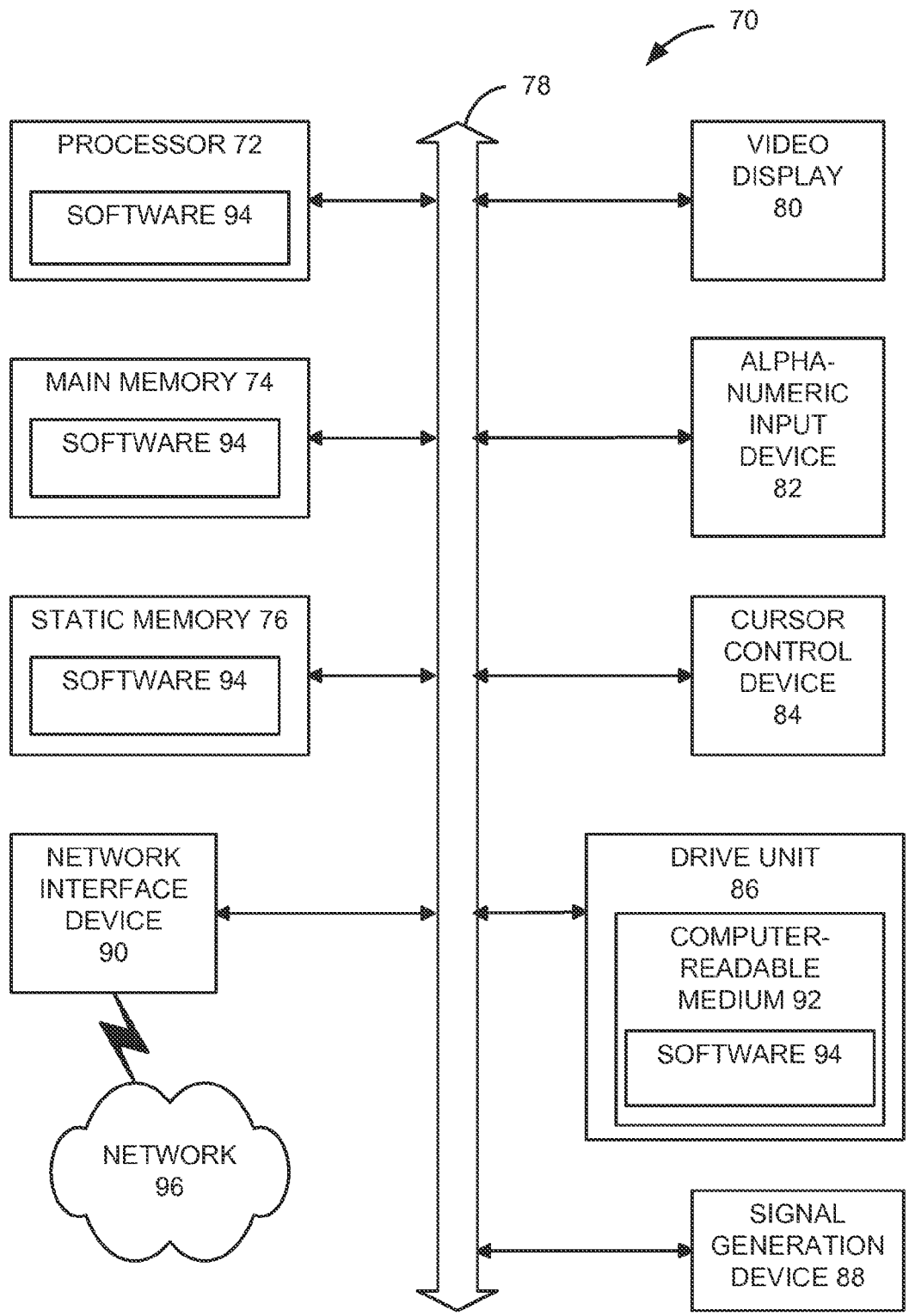
FIG. 6 illustrates a computer system in which disclosed embodiments of the disclosed techniques may be implemented, and illustrates an embodiment of the techniques in computer readable media.

FIG. 6 is a block diagram of an exemplary computer system 70 within which a set of instructions, for causing the machine to perform any one or more of the techniques described herein, may be executed. In alternative embodiments, the computer system 70 operates as a standalone device or may be connected (e.g., networked) to other computer systems. In a networked deployment, the system 70 may operate in the capacity of a server or a client machine in a server-client network environment, or as a peer machine in a peer-to-peer (or distributed) network environment. The computer system 70 may be a personal computer (PC), a workstation such as those typically used by circuit designers, a set-top box (STB), a Personal Digital Assistant (PDA), a cellular telephone, a web appliance, a network router, switch or bridge, or any machine capable of executing a set of instructions that specify actions to be taken by that machine, and networked versions of these.

The exemplary computer system 70 includes a processor 72 (e.g., a central processing unit (CPU), a graphics processing unit (GPU) or both), a main memory 74 and a static memory 76, which communicate with each other via a bus 78. The computer system 70 may further include a video display unit 80 (e.g., a liquid crystal display (LCD) or a cathode ray tube (CRT)). The computer system 70 also includes an alphanumeric input device 82 (e.g., a keyboard), a user interface (UI) navigation device 84 (e.g., a mouse), a disk drive unit 86, a signal generation device 88 (e.g., a speaker) and a network interface device 90.

The disk drive unit 86 includes a computer-readable medium 92 on which is stored one or more sets of instructions and/or data structures (e.g., software 94) embodying embodiment of the various techniques disclosed herein. The software 94 may also reside, completely or at least partially, within the main memory 74 and/or within the processor 72 during execution thereof by the computer system 70, the main memory 74 and the processor 72 also constituting computer-readable media.

The software 94 and/or its associated data may further be transmitted or received over a network 96 via the network interface device 90 utilizing any one of a number of well-known transfer protocols (e.g., HTTP). Further, aspects of the disclose techniques can employ any form of communication network. Examples of communication networks 96 include a local area network ("LAN"), a wide area network ("WAN"), and the Internet.

While the computer-readable medium 92 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the disclosed techniques, or that is capable of storing, encoding or carrying data structures utilized by or associated with such a set of instructions. The term "computer-readable medium" shall accordingly be taken to include, but not be limited to, solid-state memories, optical and magnetic media such as discs, and carrier wave signals.

Embodiments of the disclosed techniques can also be implemented in digital electronic circuitry, in computer hardware, in firmware, in special purpose logic circuitry such as an FPGA (field programmable gate array) or an ASIC (application-specific integrated circuit), in software, or in combinations of them, which again all comprise examples of "computer-readable media." When implemented as software, such software can be written in any form of programming language, including compiled or interpreted languages, and it can be deployed in any form, including as a stand-atone program or as a module, component, subroutine, or other unit suitable for use in a computing environment. A computer program can be deployed to be executed on one computer or on multiple computers at one site or distributed across multiple sites and interconnected by a communication network.

Processors 72 suitable for the execution of a computer program include, by way of example, both general and special purpose microprocessors, and any one or more processors of any kind of digital computer. Generally, a processor will receive instructions and data from a read-only memory or a random access memory or both.

To provide for interaction with a user, the invention can be implemented on a computer having a video display 80 for displaying information to the user and a keyboard and a pointing device such as a mouse or a trackball by which the user can provide input to the computer. Other kinds of devices can be used to provide for interaction with a user as well. For example, feedback provided to the user can be any form of sensory feedback, such as visual feedback, auditory feedback, or tactile feedback; and input from the user can be received in any form, including acoustic, speech, or tactile input.

As an advantage of the various disclosed techniques, waveforms may be generated without lengthy simulation that exhibit amplitude noise and timing jitter characteristics closely approximating waveforms that are actually simulated or sent through a physical transmission channel. Such waveform generation provides the realism necessary for accurate circuit simulation without the need for including a channel model in each circuit simulation, thereby dramatically reducing the simulation time.

While preferred embodiments of the invention have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A computer-implemented method comprising:
 using one or more hardware-based processors coupled to a memory to perform at least a portion of one or more of the following,
 deriving a non-ideal received signal from an ideal signal;
 computing, from the non-ideal received signal, at least one probability density function of amplitude and time values representing deviations from the ideal signal;
 deriving at least one amplitude noise component and at least one timing jitter component from the at least one probability density function; and
 generating, using the one or more hardware-based processors, a non-ideal waveform by applying the at least one amplitude noise component and the at least one timing jitter component to an ideal waveform.

2. The computer-implemented method of claim 1, wherein the non-ideal received signal comprises a non-ideal pulse response of a transmission channel.

3. The computer-implemented method of claim 2, wherein computing the at least one probability density function from the non-ideal received signal comprises sampling the non-ideal pulse response to form samples, and recursively convolving the samples.

4. The computer-implemented method of claim 1, wherein the non-ideal pulse response is derived from a non-ideal step response.

5. The computer-implemented method of claim 1, further comprising generating, from the non-ideal received signal, an eye diagram including the at least one probability density function.

6. The computer-implemented method of claim 1, further comprising convolving the at least one probability density function with sampled voltages to generate modified voltage-based probability density functions.

7. The computer-implemented method of claim 6, further comprising mathematically convolving additional amplitude noise into the modified voltage-based probability density functions.

8. The computer-implemented method of claim 1, further comprising mathematically convolving additional timing jitter into the at least one probability density function.

9. The computer-implemented method of claim 1, wherein at least one of an amplitude noise vector or a timing vector is derived from the at least one probability density function.

10. The computer-implemented method of claim 9, wherein an element from the amplitude noise vector is selected randomly to form the amplitude noise component, and wherein an element from the timing jitter vector is selected randomly to form the timing jitter component.

11. A system comprising:
 a memory;
 one or more hardware-based processors coupled to the memory;
 a derivation module to derive a non-ideal received signal from an ideal signal;
 a computation module to compute, from the non-ideal received signal, at least one probability density function of amplitude and time values representing deviations from the ideal signal; and
 a generation module, using the one or more hardware-based processors, to generate a non-ideal waveform by applying at least one amplitude noise component and at least one timing jitter component to an ideal waveform, the at least one amplitude noise component and the at least one timing jitter component being derived from the at least one probability density function.

12. The system of claim 11, further comprising a recordation module to record the at least one probability density function of amplitude and time values.

13. A computer-implemented method comprising:
 using one or more hardware-based processors coupled to a memory device to perform at least a portion of one or more of the following,
 recording a plurality of received bit patterns from a non-ideal received signal as a plurality of recorded bit patterns, each bit pattern of the plurality of received bit patterns comprising a bit of interest and a region of influence;

measuring the bit of interest in each bit pattern of the plurality of received bit patterns to determine a plurality of voltage and time values representing deviations from an ideal signal;

obtaining an ideal waveform comprising a bit pattern that includes a bit of interest and a region of influence;

comparing the bit pattern of the ideal waveform to the plurality of recorded bit patterns to determine a matching bit pattern; and generating a non-ideal waveform by applying at least one value of the plurality of voltage and time values from the matching bit pattern to the bit of interest of the bit pattern of the ideal waveform.

14. The computer-implemented method of claim 13, further comprising storing each value of the plurality of voltage and time values in a table.

15. The computer-implemented method of claim 13, further comprising averaging each value of the plurality of voltage and time values.

16. The computer-implemented method of claim 13, further comprising storing the plurality of voltage values in a table.

17. The computer-implemented method of claim 13, further comprising the plurality of time values in a table.

18. The computer-implemented method of claim 13, further comprising mathematically convolving amplitude noise into the plurality of voltage values, and mathematically convolving timing jitter into the plurality of time values.

19. A system comprising:
a memory;
one or more hardware-based processors coupled to the memory;
a recordation module to record a plurality of received bit patterns as a plurality of recorded bit patterns, each of the plurality of recorded bit patterns comprising a bit of interest and a region of influence from a non-ideal received signal;
a measurement module to measure the bit of interest in each bit pattern of the plurality of received bit patterns to determine a plurality of voltage and time values representing deviations from an ideal signal;
a comparison module to compare a bit pattern of an ideal waveform to the plurality of recorded bit patterns to determine a matching bit pattern, the bit pattern of the ideal waveform comprising a bit of interest and a region of influence; and
a generation module, using the one or more hardware-based processors, to generate a non-ideal waveform by applying at least one value of the plurality of voltage and time values from the matching bit pattern to the bit of interest of the bit pattern of the ideal waveform.

20. The system of claim 19, wherein the one or more hardware-based processors are configured to store the plurality of voltage and time values for the bit of interest in the memory.

* * * * *